United States Patent
Dao et al.

(10) Patent No.: US 11,107,067 B2
(45) Date of Patent: Aug. 31, 2021

(54) SYSTEMS AND METHODS FOR REAL-TIME APPLICATION CONFIGURATION FOR NFC TRANSACTIONS

(71) Applicant: JPMorgan Chase Bank, N.A., New York, NY (US)

(72) Inventors: Tuan Dao, Richardson, TX (US); Howard Spector, Woolwich, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 107 days.

(21) Appl. No.: 15/979,727

(22) Filed: May 15, 2018

(65) Prior Publication Data

US 2018/0349888 A1 Dec. 6, 2018

Related U.S. Application Data

(60) Provisional application No. 62/512,781, filed on May 31, 2017.

(51) Int. Cl.
```
G06Q 20/36      (2012.01)
G06Q 30/02      (2012.01)
G06Q 20/32      (2012.01)
```
(52) U.S. Cl.
CPC ....... *G06Q 20/367* (2013.01); *G06Q 20/3278* (2013.01); *G06Q 30/0233* (2013.01)

(58) Field of Classification Search
USPC .................................................. 705/35, 41
See application file for complete search history.

(56) References Cited

U.S. PATENT DOCUMENTS

| | | | |
|---|---|---|---|
| 2007/0278290 A1 | 12/2007 | Messerges et al. | |
| 2011/0216364 A1* | 9/2011 | Konno | G06F 16/00 358/1.15 |
| 2012/0290472 A1 | 11/2012 | Mullen et al. | |
| 2013/0282459 A1* | 10/2013 | Smets | G06Q 20/045 705/14.23 |
| 2014/0130035 A1 | 5/2014 | Desai et al. | |
| 2014/0279437 A1* | 9/2014 | Lee | G06Q 20/405 705/39 |
| 2015/0235256 A1* | 8/2015 | Barsoum | G06Q 20/02 705/14.33 |

(Continued)

OTHER PUBLICATIONS

EMV® Contactless Specifications for Payment Systems Book B, Version 2.6, July EMVCo, LLC (Year: 2016).*

(Continued)

*Primary Examiner* — William E Rankins
(74) *Attorney, Agent, or Firm* — Greenberg Traurig LLP

(57) ABSTRACT

Systems and methods real-time application configuration for NFC transactions using a secure-element based wallet are disclosed. In one embodiment, in an information processing device comprising at least one computer processor, a method for application configuration for NFC transactions may include: (1) a computer application executed by the information processing device receiving a selection of a provisioned financial instrument and a payment feature; (2) the computer application identifying a directory entry for the provisioned financial instrument having the selected payment feature; and (3) the computer application modifying an application priority indicator in the identified directory entry.

18 Claims, 7 Drawing Sheets

(56) References Cited

U.S. PATENT DOCUMENTS

| | | | |
|---|---|---|---|
| 2016/0086159 A1* | 3/2016 | Golla | G06Q 20/3229 |
| | | | 705/76 |
| 2016/0210626 A1* | 7/2016 | Ortiz | G06Q 20/12 |
| 2016/0217452 A1 | 7/2016 | Wong et al. | |
| 2016/0253651 A1* | 9/2016 | Park | G07F 9/023 |
| | | | 705/39 |
| 2016/0358199 A1* | 12/2016 | Van Os | G06Q 20/40145 |

OTHER PUBLICATIONS

International Search Authority, International Search Report and Written Opinion, International Application No. PCT/US18/33794, pp. 1-8, dated Aug. 27, 2018.

* cited by examiner

| | | | | | | Examples |
|---|---|---|---|---|---|---|
| '6F' | FCI Template | | | | | |
| | '84' | DF Name ('2PAY.SYS.DDF01') | | | | |
| | 'A5' | FCI Proprietary Template | | | | |
| | | 'BF0C' | FCI Issuer Discretionary Data | | | |
| | | | '61' | Directory Entry | | A0000000031010 |
| | | | | '4F' | ADF Name | Card A w/o PWP |
| | | | | '50' | Application Label | 0F |
| | | | | '87' | Application Priority Indicator | 3 |
| | | | | '9F2A' | Kernel Identifier | |
| | | | | '9F29' | Extended Selection | |
| | | | '61' | Directory Entry | | A0000000031010 |
| | | | | '4F' | ADF Name | Card A with PWP |
| | | | | '50' | Application Label | 0E |
| | | | | '87' | Application Priority Indicator | 3 |
| | | | | '9F2A' | Kernel Identifier | |
| | | | | '9F29' | Extended Selection | |

Normally set during provisioning, but modifiable by Host Wallet Service post provisioning

FIGURE 3

SYSTEMS AND METHODS FOR REAL-TIME APPLICATION CONFIGURATION FOR NFC TRANSACTIONS

RELATED APPLICATIONS

This application claims priority to U.S. Provisional Patent Application Ser. No. 62/512,781, filed May 31, 2017, the disclosure of which is hereby incorporated, by reference, in its entirety.

1. FIELD OF THE INVENTION

The present disclosure generally relates to systems and methods for real-time application configuration for NFC transactions using a secure-element based wallet.

2. DESCRIPTION OF THE RELATED ART

In general, an electronic wallet cannot alter a payment applet's data after provisioning as this generally requires keys from a payment network, card issuer, device, or operating system provider. Moreover, even if this could be performed, it is a time-consuming process and may not be complete within the standard duration of a NFC tap (e.g., 500 ms).

SUMMARY OF THE INVENTION

Systems and methods real-time application configuration for NFC transactions using a secure-element based wallet are disclosed. In one embodiment, in an information processing device comprising at least one computer processor, a method for application configuration for NFC transactions may include: (1) a computer application executed by the information processing device receiving a selection of a provisioned financial instrument and a payment feature; (2) the computer application identifying a directory entry for the provisioned financial instrument having the selected payment feature; and (3) the computer application modifying an application priority indicator in the identified directory entry.

In one embodiment, the computer application may be a host wallet service.

In one embodiment, the selection of the provisioned financial instrument and the payment feature may be received from a mobile electronic wallet executed by the information processing device.

In one embodiment, the information processing device may be a mobile electronic device.

In one embodiment, the directory entry may be in a PPSE FCI template.

In one embodiment, the directory entry may be stored in a secure element of the information processing device.

In one embodiment, the method may further include the computer application restoring the identified priority entry to a default value following a transaction.

In one embodiment, the method may further include the computer application restoring the identified priority entry to a default value after the passage of a predetermined amount of time.

In one embodiment, in response to the request, the PPSE FCI template may be provided to a point of transaction device.

In one embodiment, the selected payment feature may be to pay with an alternate currency. The alternate currency may include rewards points.

According to another embodiment, a system for application configuration for NFC transactions may include a backend for an issuer; an electronic wallet for an issuer executed by an electronic device; and a host wallet service executed by the electronic device. The electronic wallet may receive a selection of a provisioned financial instrument and a payment feature from a user, and may communicate the selection of the provisioned financial instrument and the payment feature to the host wallet service. The host wallet service may identify a directory entry for the provisioned financial instrument having the selected payment feature, and may modify an application priority indicator in the identified directory entry.

In one embodiment, the directory entry may be in a PPSE FCI template.

In one embodiment, the directory entry may be stored in a secure element of the electronic device.

In one embodiment, the host wallet service may restore the identified priority entry to a default value following a transaction. In another embodiment, the host wallet service may restore the identified priority entry to a default value after the passage of a predetermined amount of time.

In one embodiment, in response to a request, the PPSE FCI template may be provided to a point of transaction device.

In one embodiment, the backend may process a transaction using the selected payment feature.

In one embodiment, the selected payment feature may be to pay with an alternate currency. The alternate currency may include rewards points.

BRIEF DESCRIPTION OF THE DRAWINGS

For a more complete understanding of the present invention, the objects and advantages thereof, reference is now made to the following descriptions taken in connection with the accompanying drawings in which:

FIG. 3 depicts exemplary directory entries at provisioning for an account according to one embodiment;

DETAILED DESCRIPTION OF PREFERRED EMBODIMENTS

Systems and methods for real-time application configuration for NFC transactions for a secure-element based wallet are disclosed. Embodiments may alter or embed certain issuer discretionary data in an NFC transaction data package dynamically post account provisioning without having to modify an applet's data in real time.

Figure 1:
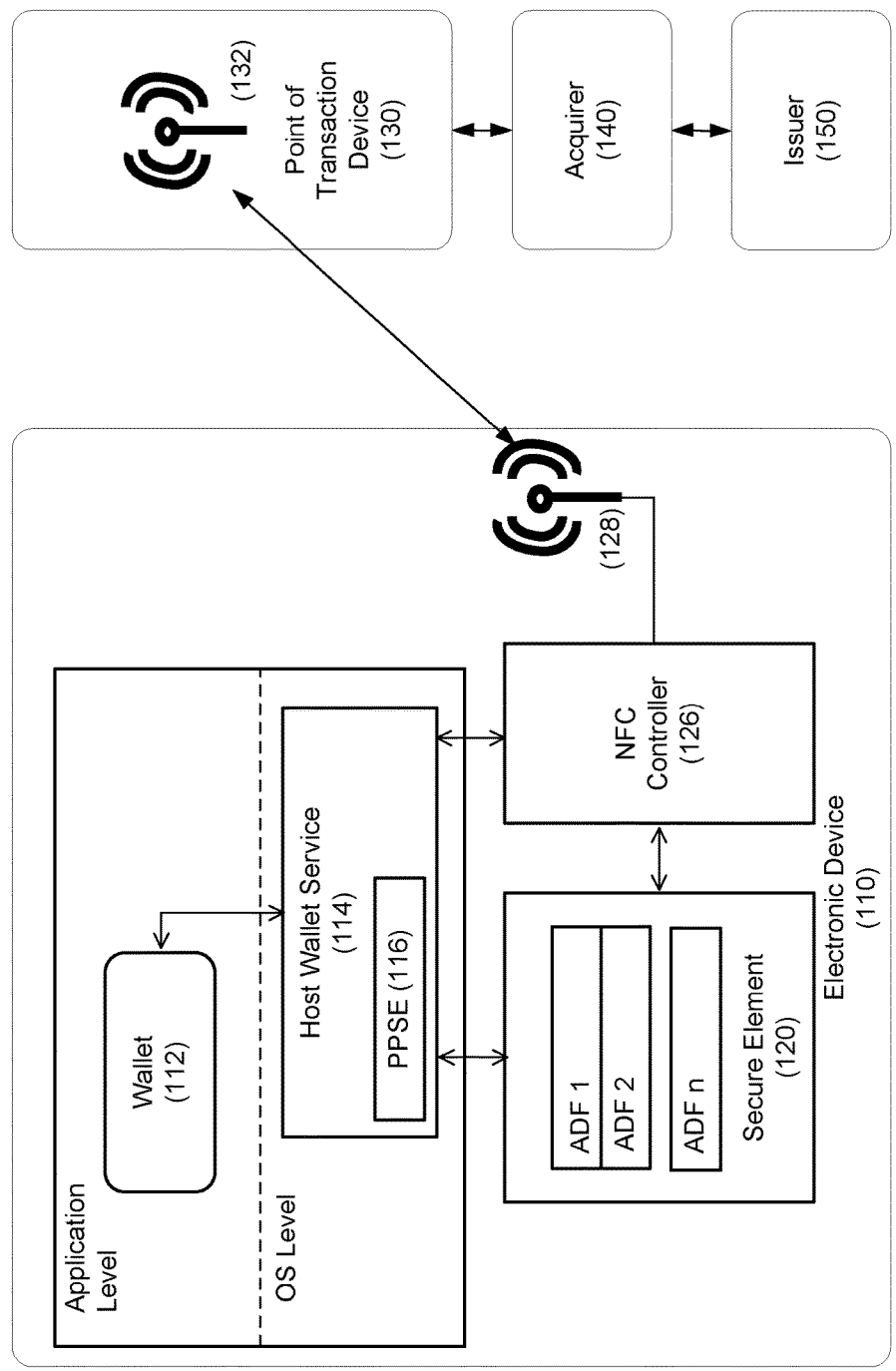
FIG. 1 depicts a system for real-time application configuration for NFC transactions using a secure-element based wallet according to one embodiment.

Referring to FIG. 1, a system for real-time application configuration for NFC transactions using a secure-element based wallet is disclosed according to one embodiment.

System 100 may include electronic device 110, which may be any suitable electronic device, including smartphones, smart watches, tablet computers, notebook computers, desktop computers, Internet of Things (IoT) appliances, fobs, etc.

In one embodiment, electronic device 110 may include a contactless card.

Electronic device may include at least one computer processor that may execute an application, such as electronic wallet 112 and an operating system, that may include host wallet service 114, and PPSE (Proximity Payment System Environment) component 116. PPSE component 116 may manage interaction with point of transaction terminal 130.

In one embodiment, PPSE 116 may be implemented in host wallet service 114 as software. In another embodiment, PPSE services 116 may be implemented in secure element 120 as hardware (not shown).

Electronic device 110 may further include secure storage, such as secure element 120. Secure element 120 may store one or more Application Definition Files (ADF) entries (e.g., ADF 1, ADF 2, . . . ADF n).

Secure element 120 may further include a plurality of executable payment applets (not shown). For example, an applet may be provided for MasterCard, Visa, American Express, Discover, etc.

Electronic device 110 may also include a radio frequency controller, such as NFC controller 126, and antenna 128.

Figure 2:
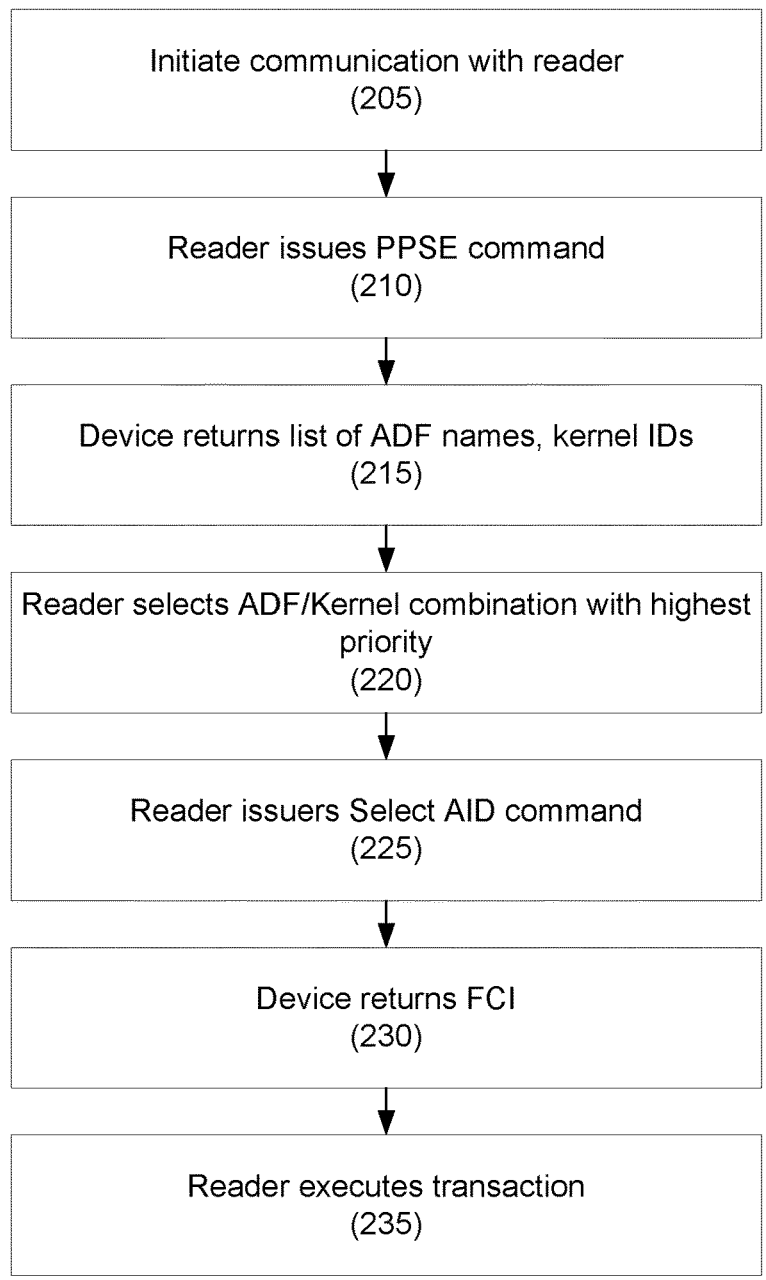
FIG. 2 depicts a method for contactless application selection according to one embodiment.

Referring to FIG. 2, a method for contactless application selection is disclosed according to one embodiment. In step 205, an electronic device may initiate communication with a reader (e.g., a card reader) at a point of transaction device (e.g., a point of sale device). In one embodiment, the user may tap the electronic device to the card reader, or may take a similar action.

In step 210, in response to the initiation, the reader may issue a "Select PPSE" (Proximity Payment System Environment) command (or similar) to the card/phone.

In step 215, the electronic device may respond with, for example, a list of Application Definition Files (ADF) names and kernel identifications for the corresponding applets. In one embodiment, the priorities for the ADFs may be provided.

An example response to the "Select PPSE" command is provided in FIG. 3.

Referring again to FIG. 2, in step 220, the reader may select the best fit ADF/kernel combination with the highest priority. In general, the reader may select the highest-priority ADF/kernel combination that the reader can process.

In step 225, the reader may communicate the selected ADF/kernel combination to the electronic device as the command "Select AID."

In step 230, the electronic device (e.g., an applet executed thereby) may return data stored in the selected AID, such as data that was stored during provisioning. This may include the ADF file for the selected AID. In one embodiment, the data may be provided in a FCI template. Once the reader has the FCI template, in step 235, it may proceed with the transaction.

According to embodiments, at provisioning, for a given account (or token), two or more Directory Entries (tag "61" in FIG. 3) in the PPSE FCI template may be created. This may be used when a single account or token may have different features, profiles, payment options, etc. For example, a feature may allow payment in an alternate currency, such as with rewards points (e.g., with the issuing financial institution, with a partner, merchant, etc.). Other profiles may be used as is necessary and/or desired.

Each Directory Entry may have a different priority level (e.g., tag "87" in FIG. 3) and a different Application Label (e.g., tag "50" in FIG. 3). For example, in FIG. 3, the first Directory Entry has an Application Label of "Card A w/o PWP" (for Pay With Points) and an Application Priority Indicator of "0F", while the second Directory Entry has an Application Label of "Chase Freedom with PWP" and an Application Priority Indicator of "0E".

Next, one of the defined EMV tags (e.g., tag 0xBF0C FCI Issuer Discretionary Data or tag 0x57 Track 2 Equivalent Data) may be chosen, and a different desired value in that tag for each of the Directory Entries may be stored. This value may be used, for example, by the merchant, acquirer, or issuer to provide different value-added service behaviors for a particular transaction in addition to standard EMV/NFC functionalities or standard functionalities provided by Host Wallet Service.

Figure 4:
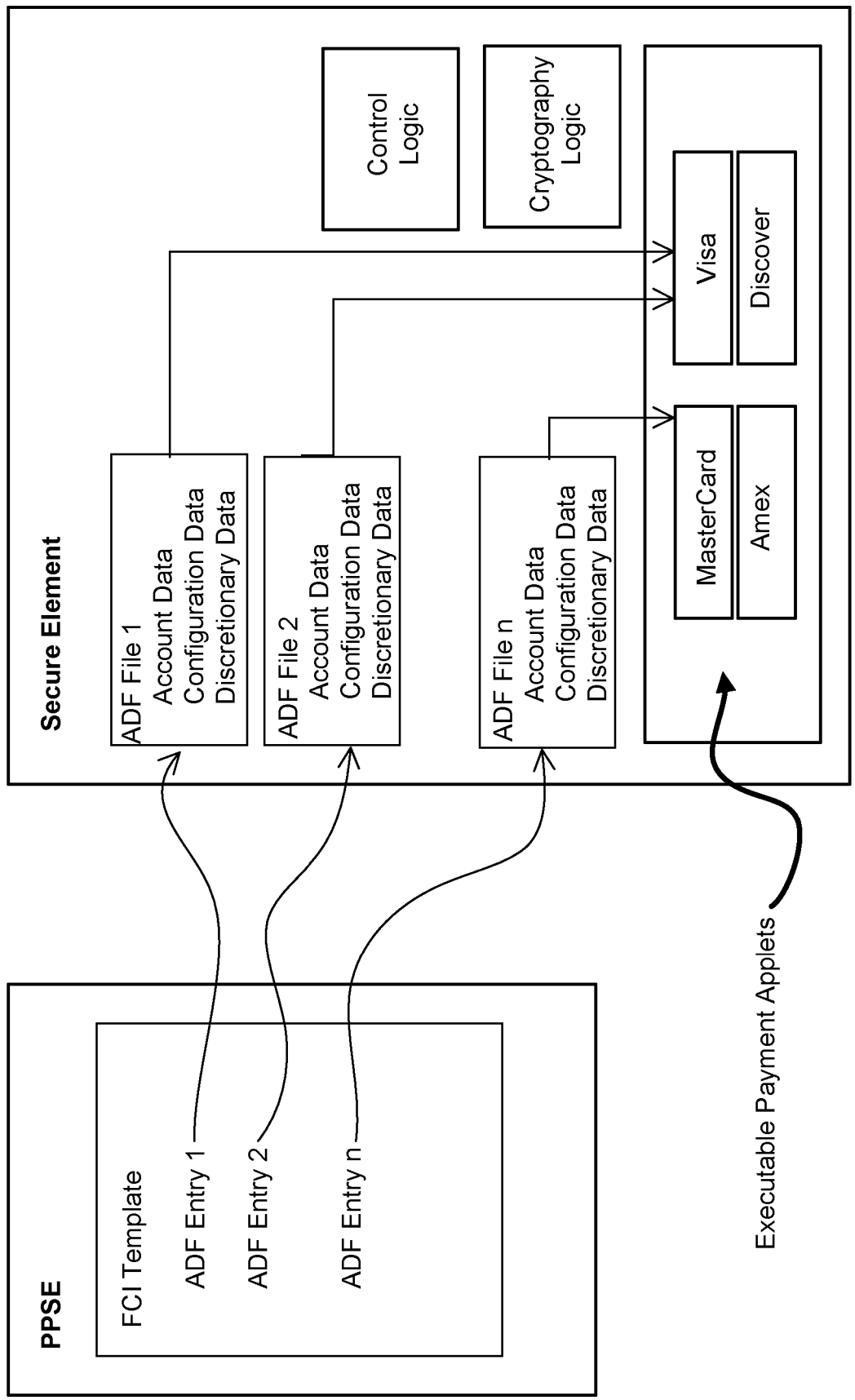
FIG. 4 depicts an exemplary data organization according to one embodiment.

For example, value 0x0F is stored in tag 0xBF0C to indicate Profile A for transaction with Pay-With-Points, and value 0x0E is stored in tag 0xBF0C to indicate Profile B for transaction without Pay-With-Points. For example, the values may be stored in the Discretionary Data section. An illustration of an exemplary data organization is provided in FIG. 4.

Figure 5:
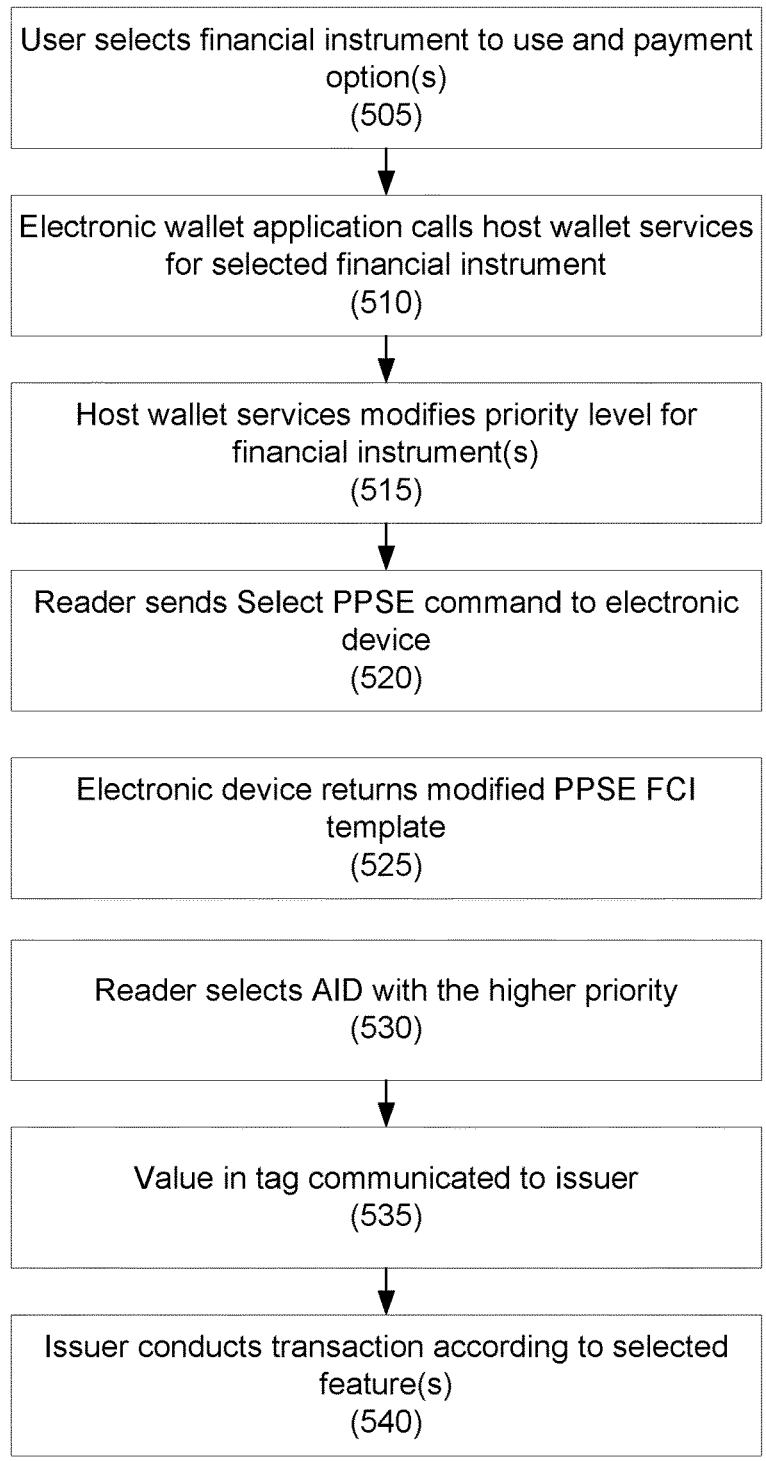
FIG. 5 depicts a method for real-time application configuration for NFC transactions using a secure-element based wallet according to one embodiment.

Referring to FIG. 5, a method for real-time application configuration for NFC transactions using a secure-element based wallet is disclosed according to one embodiment.

In step 505, prior to a transaction, a user may choose a financial instrument to pay with, and whether to use certain features or alternate payment currencies (e.g., pay with points) for the transaction. In one embodiment, the user may make this selection by cycling through available financial instruments in an electronic wallet. In another embodiment, the selection may be pre-selected.

In step 510, once a financial instrument is selected (or displayed), the electronic wallet application may call the host wallet service for the selected financial instrument, and in step 515, the host wallet service may modify the priority level in, for example, the PPSE FCI template based on the selected or displayed financial instrument.

In one embodiment, the host wallet services may modify more than one priority level if necessary. For example, other settings, features, etc. may be modified as is necessary and/or desired.

In one embodiment, the priority level may be modified for a certain amount of time (e.g., an hour) and may then be restored, or may revert, to a default setting. In one embodiment, the host wallet service may automatically implement this feature.

Next, the transaction is performed as a business as usual transaction. For example, in step 520, the reader may send the "Select PPSE" command to the electronic device, and in step 525, the electronic device may respond with the modified PPSE FCI template. In step 530, the reader may then select the AID with the higher priority, and, in step 535, the value in the chosen tag traverses untouched to the issuer.

In step 540, the issuer may process the transaction according to the selected feature(s).

Figure 6:
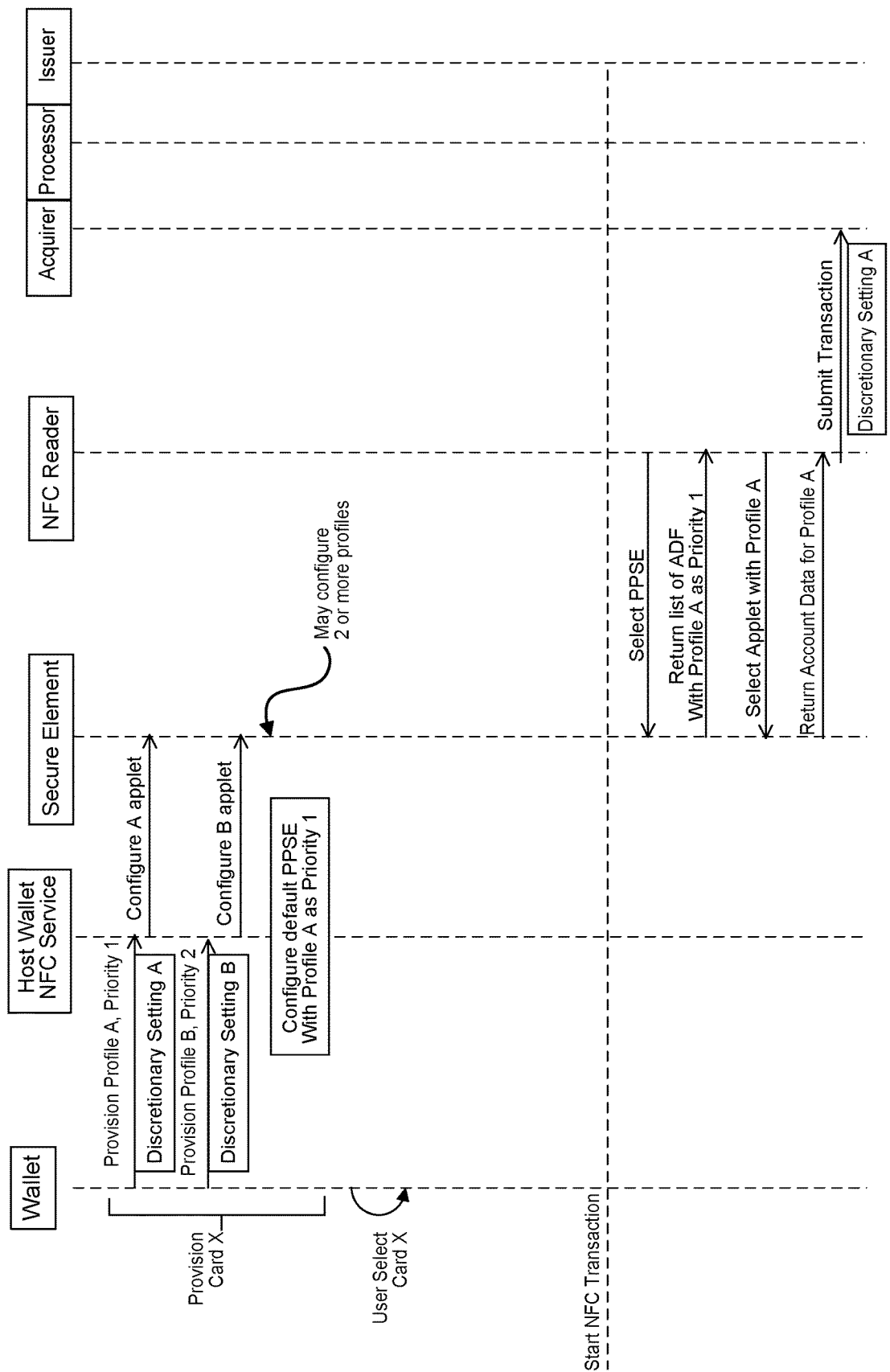
FIG. 6 depicts an exemplary a transaction flow in which default setting are used in a transaction according to one embodiment.
Figure 7:
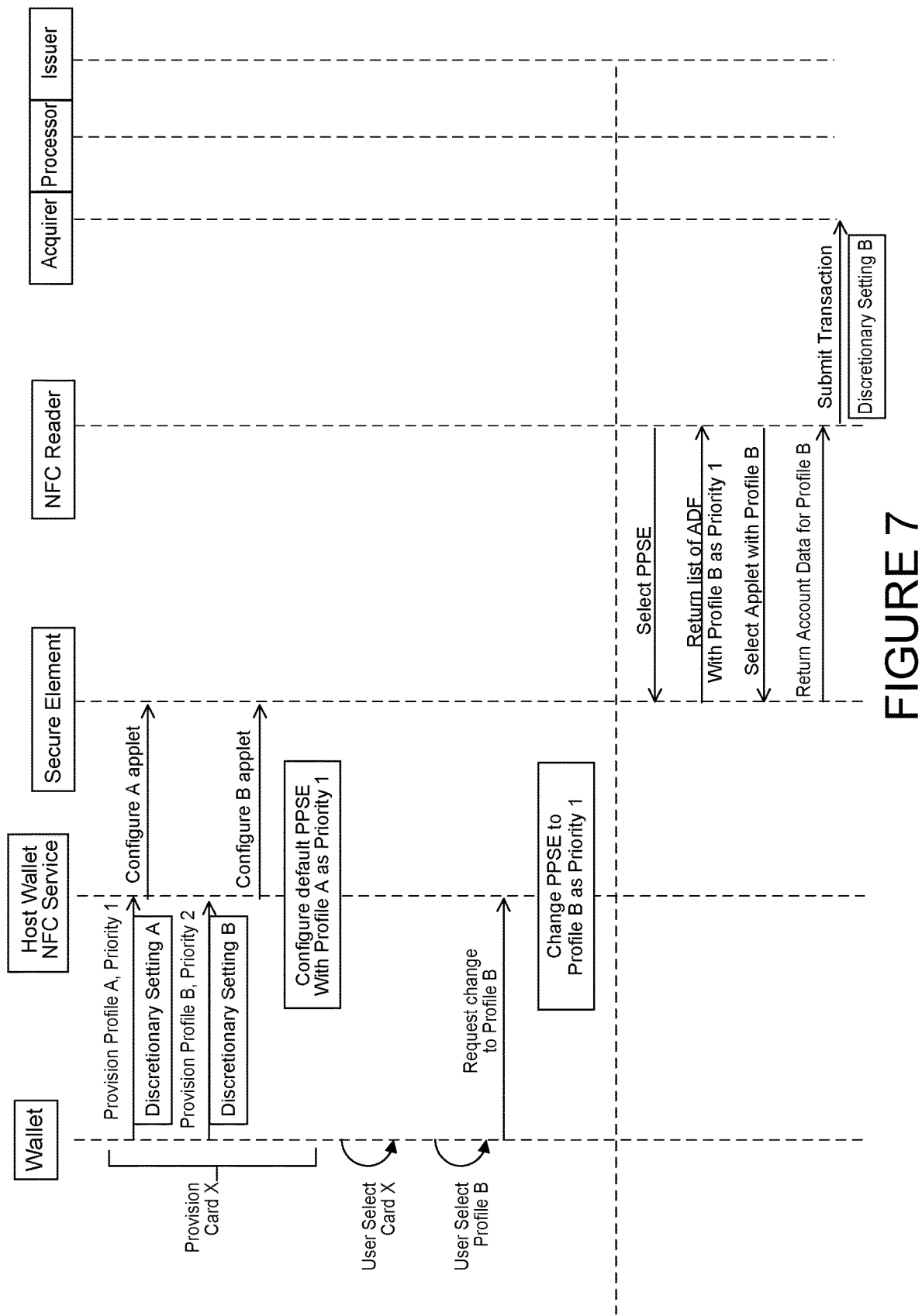
FIG. 7 depicts an exemplary transaction flow in which settings are changed according to one embodiment.

Exemplary process flows are provided as FIGS. 6 and 7. FIG. 6 depicts a transaction flow in which default setting are used in a transaction, while FIG. 7 depicts a transaction flow in which settings are changed. For example, in FIG. 6, the user selects card X, and then conducts the transaction, while in FIG. 7, the user selects card X and then selects profile B. This causes the Host Wallet NFC Service to change the PPSE to Profile B as Priority 1 so that the transaction is conducted using Card X, Profile B.

In one embodiment, using the priority level is one way for the host wallet service to guide the reader on which applet to use in the case it presents more than one directory entry in the FCI template as response to SELECT PPSE. The Reader then automatically chooses the higher-priority entry as specified by EMV specification.

In another embodiment, the host wallet service may also choose to present only one directory entry in the FCI template as response to SELECT PPSE. The host wallet service may also set the chosen profile to be active and the not chosen profile to be inactive.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for application configuration for NFC transactions, comprising:
   in an information processing device comprising at least one computer processor:
   a computer application executed by the information processing device receiving a selection of a provisioned financial instrument and a payment profile associated with the selected provisioned financial instrument, wherein the provisioned financial instrument is provisioned with at least two payment profiles, each payment profile associated with a directory entry in a Proximity Payment System Environment (PPSE) FCI template, each directory entry having a priority indicator stored therein: and
   the computer application modifying the priority indicator for the selected payment profile within the directory entry.

2. The method of claim 1, wherein the computer application is a host wallet service.

3. The method of claim 1, wherein the selection of the provisioned financial instrument and the payment profile are received from a mobile electronic wallet executed by the information processing device.

4. The method of claim 1, wherein the information processing device is a mobile electronic device.

5. The method of claim 1, wherein the priority indicator is stored in a secure element of the information processing device.

6. The method of claim 1, further comprising:
the computer application restoring the priority indicator to a default value following a transaction.

7. The method of claim 1, further comprising:
the computer application restoring the priority indicator to a default value after a passage of a predetermined amount of time.

8. The method of claim 1, further comprising:
in response to a request, providing the PPSE FCI template to a point of transaction device.

9. The method of claim 1, wherein the selected payment profile is to pay with an alternate currency.

10. The method of claim 9, wherein the alternate currency comprises rewards points.

11. A system for application configuration for NFC transactions, comprising:
a backend for an issuer;
an electronic wallet for an issuer executed by an electronic device; and
a host wallet service executed by the electronic device;
wherein:
the electronic wallet receives a selection of a provisioned financial instrument and a payment profile associated with the selected provisioned financial instrument from a user, wherein the provisioned financial instrument is provisioned with at least two payment profiles, each payment profile including associated with a directory entry in a Proximity Payment System Environment (PPSE) FCI template, each directory entry having a priority setting stored therein:
the electronic wallet communicating the selection of the provisioned financial instrument and the payment profile to the host wallet service; and
the host wallet service modifying the priority indicator for the selected payment profile within the directory entry.

12. The system of claim 11, wherein the priority indicator is stored in a secure element of the electronic device.

13. The system of claim 11, wherein the host wallet service restores the priority indicator to a default value following a transaction.

14. The system of claim 11, wherein the host wallet service restores the priority indicator to a default value after a passage of a predetermined amount of time.

15. The system of claim 11, further comprising:
in response to a request, providing the PPSE FCI template to a point of transaction device.

16. The system of claim 15, wherein the backend processes a transaction using the selected payment profile.

17. The system of claim 11, wherein the selected payment profile is to pay with an alternate currency.

18. The system of claim 17, wherein the alternate currency comprises rewards points.

* * * * *